United States Patent [19]
Oppor et al.

[11] Patent Number: 4,983,811
[45] Date of Patent: Jan. 8, 1991

[54] AUXILIARY ELECTRONIC TEMPERATURE CONTROL SYSTEM FOR OVEN

[75] Inventors: Rick L. Oppor, Hanover Park; Timothy L. Braun, Lombard, both of Ill.

[73] Assignee: Appliance Control Technology, Inc., Addison, Ill.

[21] Appl. No.: 367,863

[22] Filed: Jun. 16, 1989

[51] Int. Cl.⁵ .............................................. H05B 1/02
[52] U.S. Cl. .................................. 219/497; 219/508; 219/501; 219/505; 219/494; 432/51
[58] Field of Search .............. 219/441, 442, 490, 494, 219/497, 499, 501, 505, 507, 508, 330; 307/117; 340/584, 582; 432/51

[56] References Cited

U.S. PATENT DOCUMENTS

| | | | |
|---|---|---|---|
| 3,443,060 | 5/1969 | Smith | 219/302 |
| 4,138,607 | 2/1979 | Engelmann | 219/485 |
| 4,320,285 | 3/1982 | Koether | 219/497 |
| 4,564,749 | 1/1986 | Ishima | 219/497 |
| 4,772,778 | 9/1988 | Ogawa | 219/330 |

Primary Examiner—M. H. Paschall
Attorney, Agent, or Firm—Robert J. Black

[57] ABSTRACT

An auxiliary control system for an oven or similar device that is separate from the primary control circuitry and operates independently when the condition occurs that could be hazardous or unsafe. The control acts to prevent the temperature of a known point to rise above a predetermined set point, or points, and the primary circuitry failed to take corrective action.

12 Claims, 2 Drawing Sheets

AUXILIARY ELECTRONIC TEMPERATURE CONTROL SYSTEM FOR OVEN

BACKGROUND OF THE INVENTION

1. Field of the Invention

The present invention relates to temperature control systems, and more particularly to an auxiliary temperature monitoring circuit useful to detect over or under temperatures in heating or cooling environments.

2. Background Art

Temperature monitoring circuitry has become well known and an integral portion of many household appliances, such as microwave ovens, convection ovens, room heaters, dryers, and many more. Temperature control systems also find their usage in systems of cold control, such as refrigerators, freezers, air-conditioning systems, etc.

Most existing temperature control circuits are part of a master or main controller system in today's technology, usually employing a microprocessor circuit. As long as the circuit is functioning correctly, temperatures will be fed back to the microprocessor and in turn the microprocessor will turn off relays or solid state switching devices until the temperature measured by an associated sensor is acceptable. This particular type of control will not function properly if the microprocessor, the clock circuit, temperature detection circuit, or relay circuit should fail. Present safety methods typically utilize a so-called "watchdog" function wherein the main loop control circuitry must maintain the proper settings, or in turn the watchdog circuit will inhibit the operative functions.

Accordingly, it has been found most desirable to provide a separate monitoring and control system which will be able to override a master control system should the master control system or any of its portions malfunction.

SUMMARY OF THE INVENTION

The present invention consists of electronic circuitry that includes a probe or detector circuit that provides two reference voltages and a varying voltage depending upon the temperature measured within the environment to be monitored. For example, in a microwave oven control system this would be the oven probe inserted into the oven area. The reference outputs of the probe are connected to two different comparator circuits as set points, with the variable reference voltage being connected to both comparator circuits. The comparator circuits, in turn, have an output connected to a load disabling circuit which functions to control the associated heating or cooling equipment. In the case of an oven control system, the controlled elements would be either baking or broiling elements. Also included is an inhibit circuit that operates in connection with the oven door, or similar device, to effectively disable the first comparator circuit from controlling the disable circuit, thus rendering the first voltage reference and comparator inoperative so that a second set point and its associated comparator circuit then operate to control the disable circuit which in turn will control the associated heating or cooling equipment.

From the foregoing it will be obvious that the invention consists of a circuit that establishes a voltage set point, or points, that represent temperatures that are to be detected and acted upon. The two compare functions that compare the above mentioned voltages (a low and a high point) provide a comparison against that variable voltage from the probe that represents the actual temperature of the oven or similar cavity. The third, or varying signal, is combined with the two compare function outputs. The third signal, the so-called "doorlock" signal, is mentioned, wherein the doorlock signal will override the low trip point compare output and allow the temperature to rise to the next trip point. At any time, should the compare functions indicate a trip point has occurred without the override, the low point control of the relay or associated equipment for the heating or cooling elements will be disabled, and the temperature will not rise above the trip point that initiated the disable function. With a single component selection, the disable function can be implemented as a latching function that will permanently disable the relay control, or it can be implemented as a regulated function that will allow the heat to drop and cycle back up to the trip point again. Hysteresis built into the compare function determines the temperature in which the loop will cycle.

DESCRIPTION OF THE PREFERRED EMBODIMENT

Figure 2:
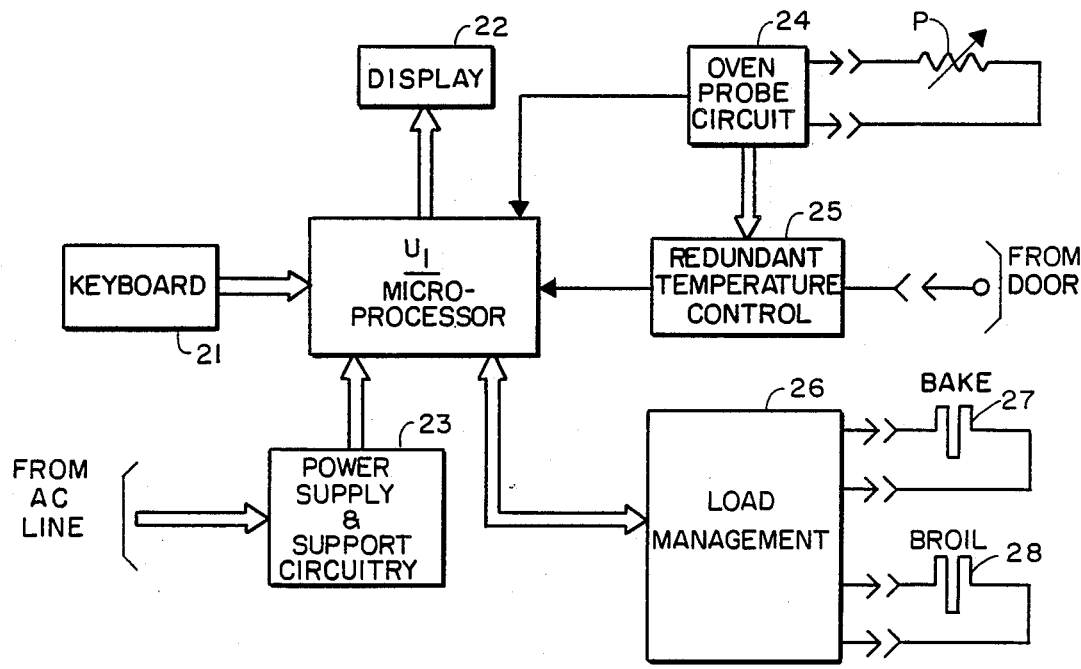
FIG. 2 is a block diagram of an electronic oven showing the master control system and the auxiliary system as set forth in the present invention.

Referring first to FIG. 2, there is shown the main control loop U1, which typically is a microprocessor, that monitors the oven cavity temperature and will initiate a bake, broil, or clean functions, as required. The determination being made by selections set forth on the associated keyboard 21. To maintain the required temperature for its function, either the bake 27 or broil 28 or both heating mechanisms will turn off or on. In the event that a single component failure occurs and the primary control loop is unable to function properly, a loss of temperature control could occur. It is at this point a failure in which the heating mechanism is left in the "on" condition that the invention becomes of interest.

Figure 1:
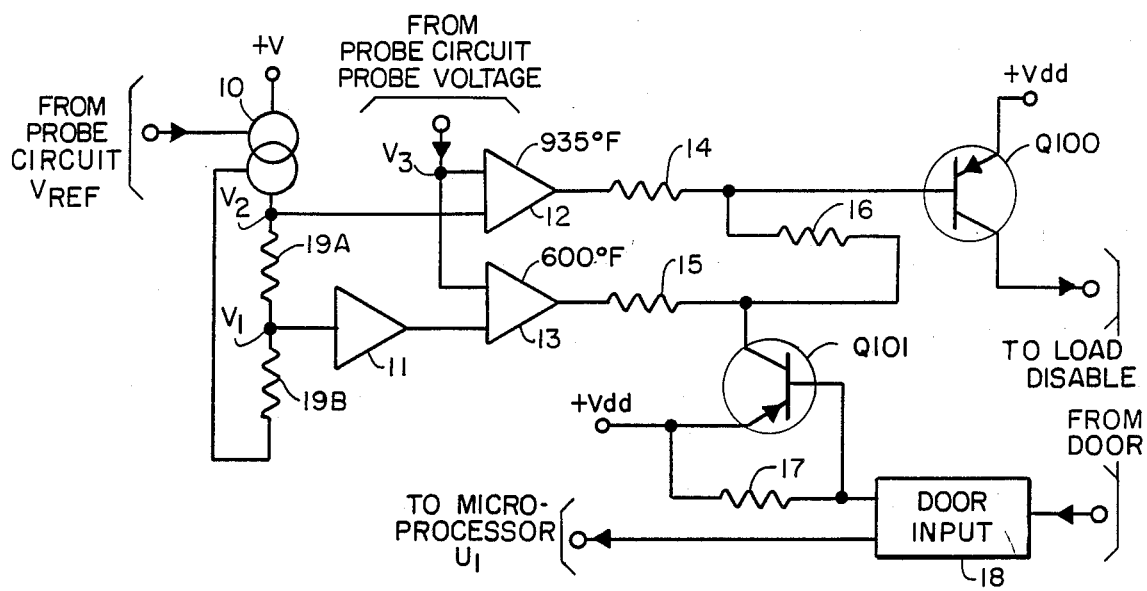
FIG. 1 is a simplified schematic diagram of the auxiliary monitor circuitry of the present invention.
Figure 3:
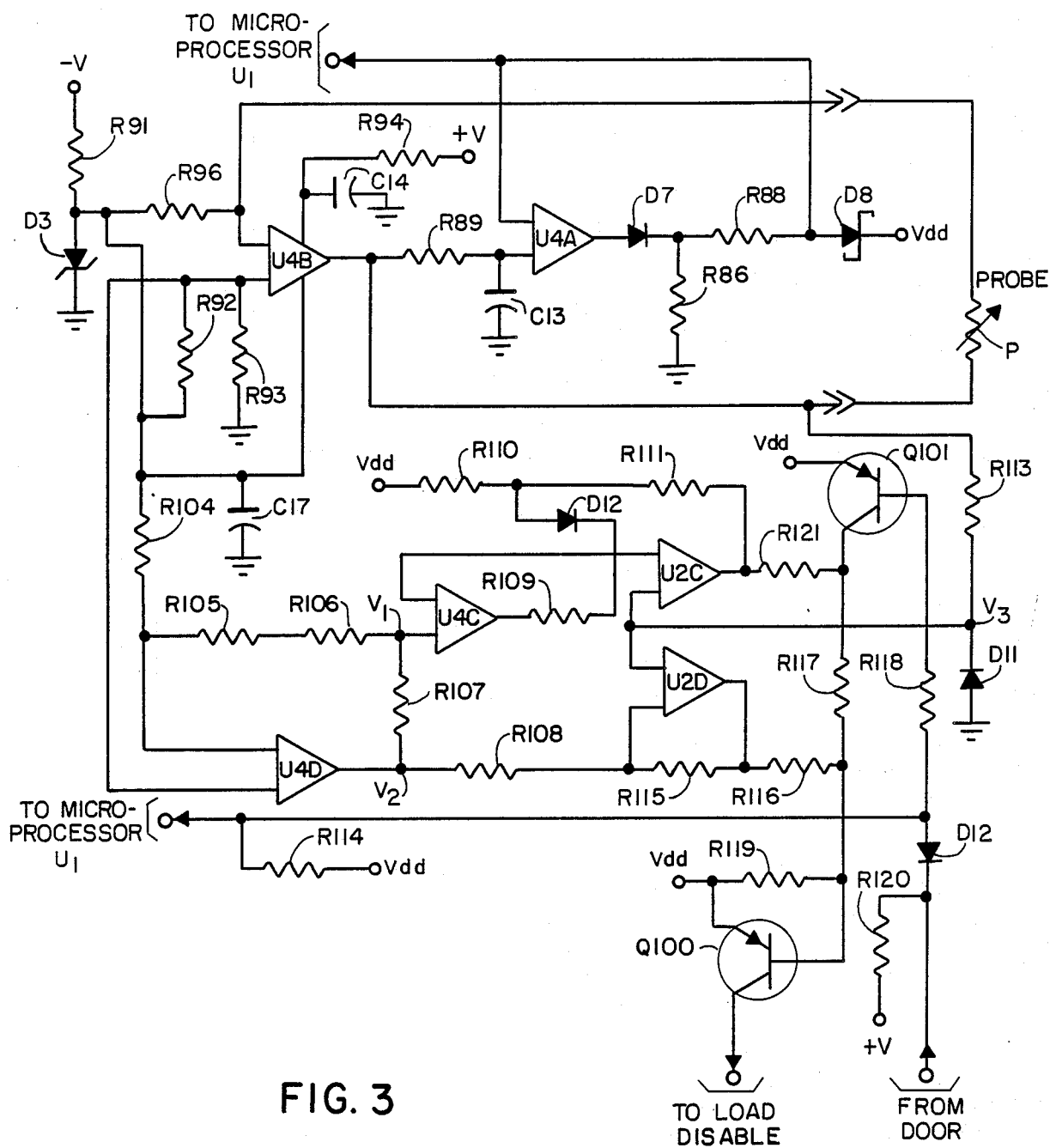
FIG. 3 is a schematic diagram in detail of the auxiliary control system in accordance with the present invention.

Referring now to the schematic of FIG. 3, the circuit as used in a microwave oven is shown, wherein the oven probe P is connected to a constant voltage source consisting of differential amplifier U4B, reference diode D3, resistors R91, R92, R93, and R96 and a voltage source. Voltage developed across the probe is directly related to the temperature of the oven cavity in which the probe P is placed. This voltage is then conditioned by differential amplifier U4A, diode D7, Schottky diode D8, and resistors R86 and R88, so as to prevent an over or under voltage stress on the primary control loop U1 of FIG. 2. A mirror constant current loop, including differential amplifier U4D and resistors R104, R105, R106 and R107, is then used with equivalent impedances that represent the temperatures that are to be detected. In the present environment, 600 and 935 degree set points are selected and their equivalent impedances, consisting of resistors R105, R106 and R107 are used in the constant current loop as points at which safety could be in question without temperature and/or circuit control. The current loop has fixed voltage monitoring points V1 and V2 that can be used to compare against the varying voltage of the oven probe circuitry V3 (as shown in FIG. 1). Since the second current loop utilizes the same reference, diode D3, it will track any temperature drift of the primary current loop; precision resistors R104, R106 and R107 in the second 25 current loop will assist in reducing any error.

As noted previously, hysteresis is utilized in the compare function (comparator amplifiers U2C and U2D), to prevent any oscillations at or near the trip point. For the 600 degree set point, the fixed voltage reference at resistor R106 is conditioned as to provide isolation from the hysteresis (via amplifier U4C, resistors R109 and R110, and diode D12) and allows the hysteresis to function properly by blocking the amplifier's U4C ability to compensate to maintain the voltage when the compare function goes low. By adding a pull up resistor R110 at the input of the comparator, amplifier U2C, it allows the loop to recover once the temperature has dropped to a predetermined point. Utilizing a capacitor in place of the pull up resistor R110, the circuit would then operate in a latch mode and thus prevent any temperature to be achieved once it has been tripped. The door signal received via drive transistor Q101 is able to override the inhibit function by applying a voltage of +5 volts between the output and the inhibit drive transistor Q100. The door signal functions only to disable the lower trip point and allows the oven cavity to reach cleaning temperatures.

The 935 degree monitoring is at the output of the current loop by comparator amplifier U4D and is not affected by the hysteresis of the compare function. The compare function is separate from the 935 degree but utilizes the same probe voltage (V3) from the primary current loop.

Outputs of the two compare functions provided by comparator amplifiers U2C and U2D are connected in an "or" function to drive transistor Q100 to inhibit the heating function once one of the trip points has been reached. This action then prevents a temperature greater than 600 degrees without the door signal present and a temperature of 935 degrees, when the door signal is operated, to be reached.

It will be obvious from the foregoing that a number of modifications may be made to the present invention which has been described in connection with a microwave oven. For example, it would be possible to compare directly for the 600 degree trip point using a resistive divider without the second current source and reset the microprocesor in the primary control loop to terminate all functions. The circuit could then be implemented without the direct connection of the door signal and the microprocessor could read the door status and an out signal to override the 600 degree trip point. It will also be possible to repeat the above but add the 935 degree trip point.

It will be obvious that it is also possible to trip at any other temperatures which may be set and the ability to utilize just the detection of the 600 degrees without the door signal for those microwave oven models that do not employ self-cleaning.

The objective of the present invention is to have the two signals that will start out at different voltages at lower temperatures and will follow different slopes such that the two points wiil cross at 600 degrees or at a desired temperature. This particular objective might be accomplished by placing a series impedance in the oven probe (resistive temperature device) path, such that the voltage is higher for the series impedance than the oven probe voltage point, create a resistor divider such that the voltage at the divider will equal the voltage at the oven probe for the desired temperature to be detected. Thus this signal can be used for inhibiting the heating function and also incorporate the door signal override signal. It is only required, of course, that the present system provide the ability to control temperature when the primary control loop fails and functions in a transparent manner during normal operation. It will be obvious that from the foregoing that this same concept can be utilized in virtually any temperature regulating control system.

While it will be obvious to those skilled in the art that numerous modifications can be made without departing from the spirit of the present invention, it should be limited only by the scope of the claims appended hereto.

What is claimed is:

1. An auxiliary temperature control circuit for use in an environment normally under control of a primary temperature control system, said auxiliary temperature control circuit comprising:
    a first comparator circuit, including connection to a first voltage reference;
    a second comparator circuit, including connection to a second voltage reference;
    a temperature sensor means, including separate connections to said first and to said second comparator circuits, operated in response to temperature changes to generate a variable voltage reference representative of said changes;
    a disable circuit, including input circuit connections from said first comparator circuit, and from said second comparator circuit;
    and an output circuit connection to a heat generating means, said disable circuit initially operated in response to said first comaprator circuit, said first comparator circuit generating an output signal over said output circuit connection in response to the voltage generated by said temperature sensor means being of approximately the same magnitude as said first voltage reference to render said heat generating means, unoperated.

2. An auxiliary temperature control as claimed in claim 1 wherein:
    there is further included an override circuit operated in response to a signal generated by a connected manually operated apparatus to override said output signal generated by said first comparator circuit;
    whereby said second comparator circuit is operated in response to the voltage generated by said temperature sensor and said second reference voltage being approximately equivalent, to operate said disable circuit to render said heat generating means, unoperated.

3. An auxiliary temperature control circuit as claimed in claim 1 wherein:
    said environment is an oven and said temperature sensor means is an oven probe located within said oven.

4. An auxiliary temperature control as claimed in claim 1 wherein:
    said heat generating means comprise at least one oven heating elememt.

5. An auxiliary temperature control circuit as claimed in claim 3 wherein:

said heat generating means comprise a baking heating element and a broiling heating element.

6. An auxiliary temperature control circuit as claimed in claim 2 wherein:
said manually operated apparatus comprises an oven door operated to generate said signal to override said output signal in response to the opening of said oven door.

7. An auxiliary temperature control circuit as claimed in claim 6 wherein:
said oven door further includes a circuit connection to said primary temperature control system and in response to opening of said oven door said signal is further transmitted to said primary temperature control system.

8. An auxiliary temperature control circuit as claimed in claim 1 wherein:
said first voltage reference determines a first set point and said second voltage reference determines a second set point.

9. An auxiliary temperature control circuit as claimed in claim 8 wherein:
said first set point is indicative of a first excessive temperature condition and said second set point is indicative of a second excessive temperature condition greater than said first set point temperature.

10. An auxiliary temperature control circuit as claimed in claim 9 wherein:
said heat generating means, are recycled after being rendered unoperated in response to said disable means and response to the voltage generated by said temperature sensor being substantially diffferent than the reference voltages.

11. An auxiliary temperature control circuit as claimed in claim 9 wherein:
said disable circuit operating in response to said second comparator circuit to render said heat generating means, unoperated.

12. An auxiliary temperature control circuit as claimed in claim 3 wherein:
said oven probe is connected to a constant current source and develope across said probe a voltage directly related to the temperature of said oven cavity.

* * * * *